United States Patent
Apetrei

(10) Patent No.: US 10,560,190 B2
(45) Date of Patent: Feb. 11, 2020

(54) ADAPTING TO DIFFERING OPTICAL LINE TERMINATION CHARACTERISTICS

(71) Applicant: Greenwave Systems PTE. LTD., Singapore (SG)

(72) Inventor: Florin D. Apetrei, Shanghai (CN)

( * ) Notice: Subject to any disclaimer, the term of this patent is extended or adjusted under 35 U.S.C. 154(b) by 0 days.

(21) Appl. No.: 15/974,907

(22) Filed: May 9, 2018

(65) Prior Publication Data

US 2019/0349086 A1    Nov. 14, 2019

(51) Int. Cl.
   *H04B 10/27*    (2013.01)
   *H04L 12/24*    (2006.01)

(52) U.S. Cl.
   CPC ......... *H04B 10/27* (2013.01); *H04L 41/0816* (2013.01)

(58) Field of Classification Search
   None
   See application file for complete search history.

(56) References Cited

U.S. PATENT DOCUMENTS 6,532,103 B1 *  3/2003  Sakano ............. H04B 10/2941
                                                    359/337.11
2011/0091213 A1 * 4/2011 Kawaza ............... H04J 14/0282
                                                    398/68
2017/0171647 A1 * 6/2017 Gao ........................ H04B 10/25

OTHER PUBLICATIONS

ITU-T Recommendation G.984.3, "Gigabit-capable Passive Optical Networks (G-PON): Transmission convergence layer specification," Mar. 2008, Retrieved from https://www.itu.int/rec/dologin_pub.asp?lang=e&id=T-REC-G.984.3-200803-S!!PDF-E&type=items on May 2, 2018.
ITU-T Recommendation G.988 "ONU management and control interface (OMCI) specification," Oct. 2010, Retrieved from https://www.itu.int/rec/dologin_pub.asp?lang=e&id=T-REC-G.988-201010-S!!PDF-E&type=items on May 2, 2018.

* cited by examiner

*Primary Examiner* — Casey L Kretzer
(74) *Attorney, Agent, or Firm* — Young's Patent Services; Bruce A Young

(57) ABSTRACT

An optical network unit (ONU) of a gigabit-capable passive optical network (GPON) adapts to an optical line termination (OLT) to which it is coupled. The ONU determines a type of the OLT to which it is coupled, and based on the type, configures an optical transmitter of the ONU to be compatible with the OLT. The ONU can also determine which OMCI software stack to load based on the type of the OLT.

18 Claims, 5 Drawing Sheets

ADAPTING TO DIFFERING OPTICAL LINE TERMINATION CHARACTERISTICS

BACKGROUND

Technical Field

The present subject matter relates to optical communications. More specifically, the present subject matter relates to adapting an optical transmitter to conform to characteristics of an optical receiver.

Background Art

A gigabit-capable passive optical network (GPON) is type of high-speed optical data communication network with characteristics defined by ITU-T recommendation series G.984.1 through G.984.6. Of particular interest is ITU-T Recommendation G.984.3 "Gigabit-capable Passive Optical Networks (G-PON): Transmission convergence layer specification" published 3/2008 which is incorporated by reference herein and is available for download at https://www.itu.int/rec/T-REC-G.984.3/en. ITU-T Recommendation 984.4 was migrated into ITU-T Recommendation G.988 "ONU management and control interface (OMCI) specification" published 10/2010 which is incorporated by reference herein and is available for download at https://www.itu.int/rec/T-REC-G.988/en. GPON can transport many types of network data, such as Ethernet packets, asynchronous transfer mode (ATM) data, and time-division multiplexing (TDM) (e.g. public-switched telephone network (PSTN), integrated services digital network (ISDN), T1/E1 and T3/E3) traffic.

A high level block diagram of a GPON 100 is shown in FIG. 1. Two active devices communicate with each other in a GPON 100. An optical line termination (OLT) device 110, which is often located at a central office of a telecommunications carrier, can communicate with either an optical network unit (ONU) 131-139 or an optical network termination (ONT). GPONs support a wide variety of data services and can be used to create high-bandwidth networks over very long distances, up to several kilometers.

A single fibre 105 connects to the OLT which may be referred to as the root of an optical distribution network. The fibre 105 may run to a passive optical splitter 120 which can be located near the location of the user equipment (UE) of the clients. The optical splitter divides the optical power into N separate paths, where N can vary between 2 and a theoretical maximum of 128. From the optical splitter, a single mode (SM) fibre strand 121-129 can be run to each individual piece of equipment, such as the ONUs 131-139, which may be referred to as leaves of the optical distribution network. The GPON 100 provides two multiplexing mechanisms. For data sent from the OLT 110 to the clients (downstream data) though the ONUs 131-139, data packets are broadcast to all ONUs/ONTs 131-139 coupled to the OLT 110. Encryption is used to prevent unauthorized receivers from getting the data. For data sent from the clients through the ONUs 131-139 to the OLT 110 (upstream data), data packets are transmitted using a time-division multiple access protocol.

The OLT 110 has an optical transmitter that includes a laser 112 and transmit optics 114 that channel the optical energy from the laser 112 to the fibre 105. The OLT 110 also has an optical receiver that includes receive optics 116 that channel the optical energy received through the fibre 105 to an optical transistor 118 or other light sensitive electronics which converts the optical signal into an electrical signal. The quality of the receive optics 116 may vary between suppliers of OLTs 110 and in some cases, a received optical signal that is consistent with the ITU-T recommendations may result in an unacceptable bit-error-rate in the OLT 110.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Figure 1:
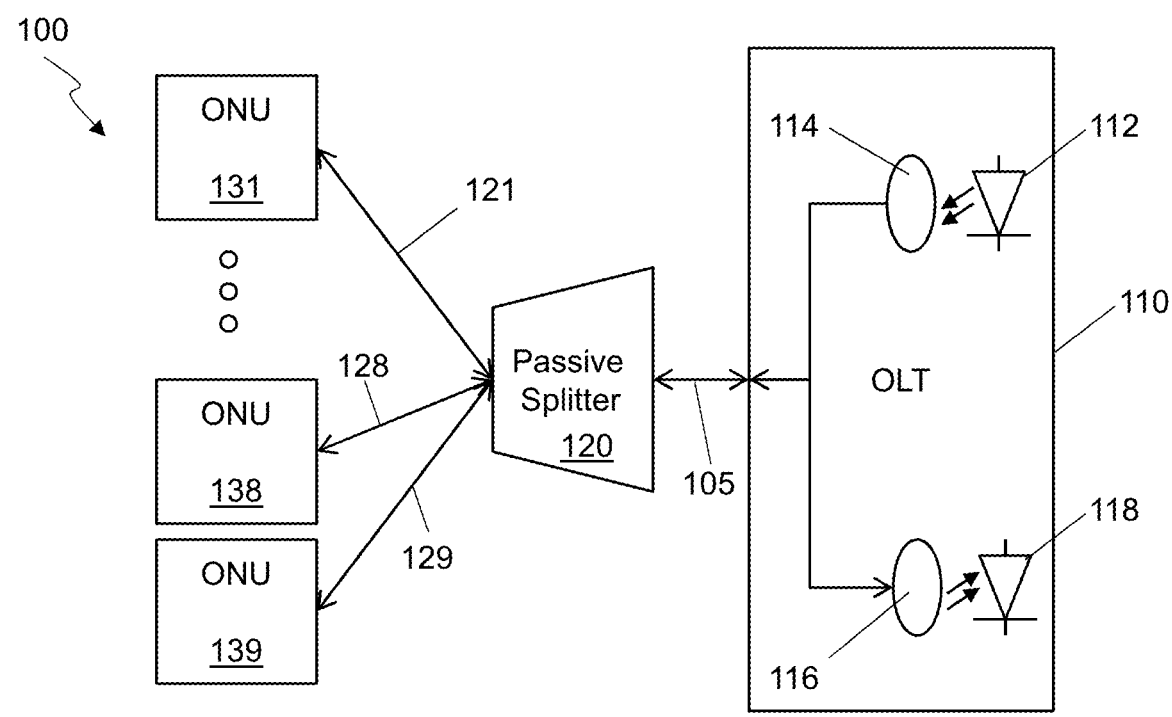
FIG. 1 is a block diagram of a traditional gigabit-capable passive optical network (GPON)

A gigabit-capable passive optical network (GPON or G-PON) is an industry standard term referring to a passive optical network (PON) compliant with ITU-T recommendations G.984-1-G.984-6. The phrase (or its abbreviation) is used more broadly herein to cover those networks as well as similar networks at higher speeds such as 10-gigabit-capable passive optical networks (XG-PON), 40-gigabit-capable passive optical networks (NG-PON2), and other passive optical networks having a similar topology to that shown in FIG. 1 and operating at a speed of 1 gigabit or higher.

An optical line termination (OLT) device is a device that terminates a common, or root, endpoint of an optical distribution network. It can both send and receive on the optical distribution network and can communicate through a single fibre connection coupled through a passive optical splitter with multiple ONUs or ONTs. While an OLT may be fully compliant with one or more ITU-R recommendations, the phrase "optical line termination" or its acronym "OLT," as used herein, can refer to any device connected to a root of an optical distribution network.

An optical network unit (ONU) is a device that terminates an endpoint, or leaf, of an optical distribution network. An optical network termination (ONT) is a special case of an ONU and whose differences are not important for the disclosed concepts. Therefore, the phrase "optical network unit," or the acronym "ONU," as used here, can refer to either an ONT or a generic ONU. While an ONU may be fully compliant with one or more ITU-R recommendations, the term, as used herein, can refer to any device connected to a leaf of an optical distribution network.

An OMCI message is a message that is compliant with the ITU-T Rec G.988 OMCI specification, whether or not the full OMCI specification is implemented by the system where the OMCI message is observed.

Physical layer operations, administrations and maintenance (PLOAM) refers to a protocol defined by ITU-T Rec G.984.3 which uses PLOAM messages between an OLT and an ONU for the purposes of operations, administration, and maintenance of the GPON. A PLOAM message, as the term is used herein, is considered to be a physical layer management message generated by a data-link layer (e.g. layer 2) of a network stack.

Turning now to a description of the technology disclosed herein, a GPON has an OLT and one or more ONUs that communicate with each other over a fiber connection. While there can theoretically be as many as 128 ONUs coupled to a single OLT, for the purposes of this disclosure, a single ONU will be discussed and one of ordinary skill can understand that the embodiments disclosed herein can be applied to multiple ONUs in a single GPON.

While the ITU-T recommendations mentioned above are intended to allow interoperability between an OLT manufactured by one supplier and an ONU manufactured by a different supplier, incompatibilities sometimes arise. It is common for a network to be built using equipment from a single supplier to avoid such incompatibilities because if a problem does arise, it is easy to determine which supplier has the issue; there is only one supplier involved.

In one particular instance an ONU to be provided by the applicant was required to work with a first OLT from a vendor A, and to alternatively work with a second OLT from vendor N. During testing, it was discovered that the ONU, which was believed to be compliant with the ITU-T recommendations, worked reliably with the OLT from vendor N, but had an unacceptable upstream (i.e. from ONU to OLT) bit rate error rate when used with an OLT from vendor A, which in some cases resulted in a completely inoperable connection between the ONU and the OLT from vendor A. Further testing using an ONU from vendor A with the OLT from vendor A showed that the while that combination yielded a reliable network connection, the optical eye diagram generated by the transmitter of the ONU from vendor A, was not compliant with ITU-T recommendations.

Figure 2:
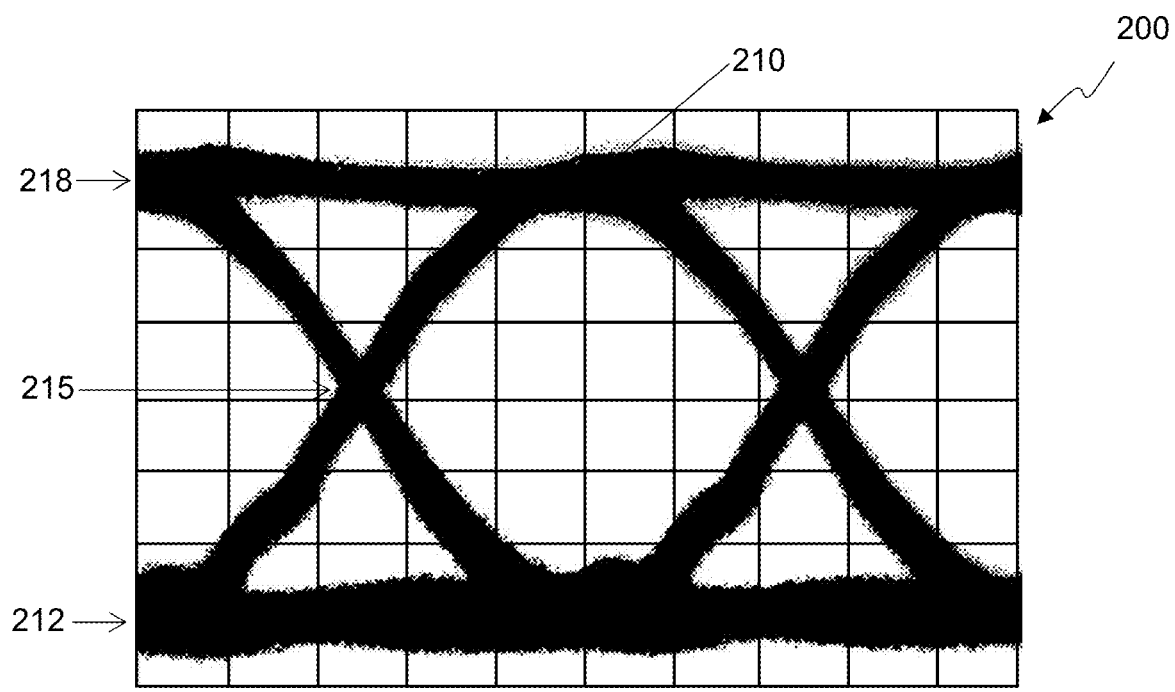
FIG. 2 is a representation of an eye-diagram compatible with a first type of OLT receiver.

Once it was known that the ONU from vendor A had a different eye diagram, various configurations of the optical transmitter in the applicant's ONU were tried. FIG. 2 shows a measurement 200 of an eye diagram 210 of the optical signal sent by the optical transmitter in the applicant's ONU as originally configured, using first settings to be compliant with ITU-T recommendations. The eye diagram 210 shows a high power level 218 of the optical transmitter and the low power level 212 of the optical transmitter. The crossover point 215 is at about the 50% point between the high power level 218 and the low power level 212 of the optical transmitter to be able to provide an eye diagram that is compliant with ITU-T recommendations. The applicant's ONU is able to reliably communicate with the OLT from vendor N while configured to provide the eye diagram 210 of FIG. 2, but the applicant's ONU was unable to reliably communicate with the OLT from vendor A in this configuration.

Figure 3:
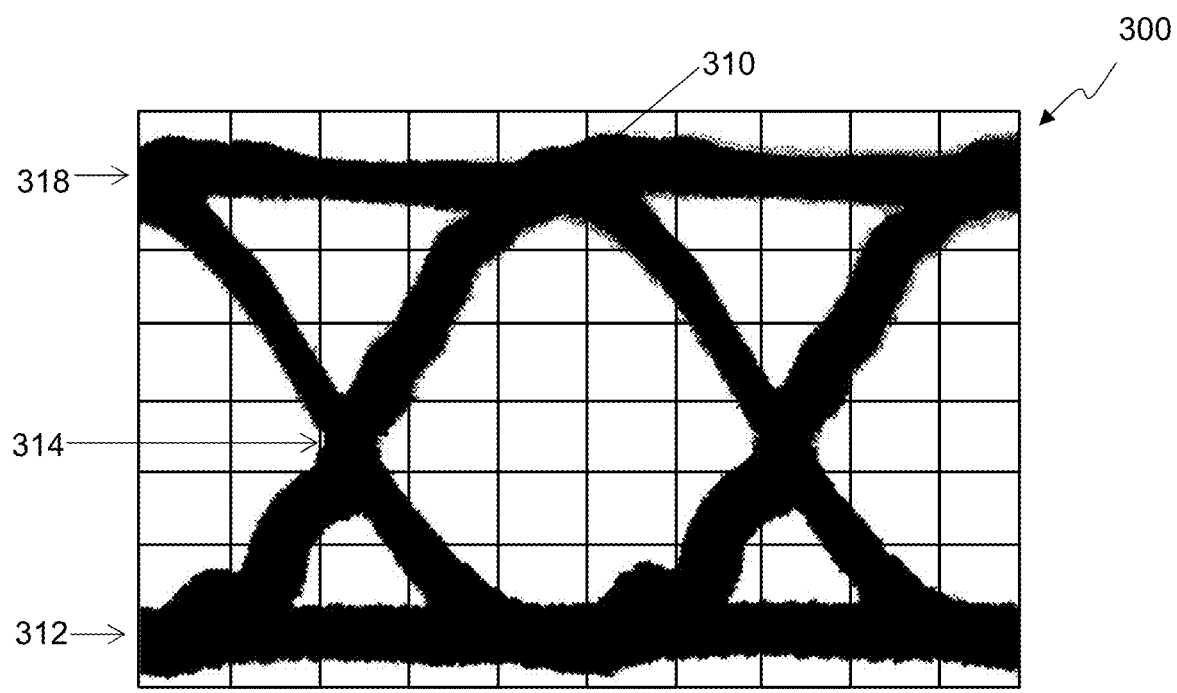
FIG. 3 is a representation of an eye-diagram compatible with a second type of OLT receiver.

FIG. 3 shows a measurement 300 an eye diagram 310 of the applicant's ONU configured using second settings to have duty cycle distortion to provide a crossing point 314 that is at about the 40% point between the high power level 318 and the low power level 312 of the optical transmitter to be able to provide an eye diagram that provides for reliable communication with the OLT from vendor A, even though it may not be compliant with ITU-T recommendations.

The optical transmitter of the applicant's ONU can be configured using one of two different control mechanisms, although other embodiments may provide for more or different control mechanisms to control the eye diagram of the optical transmitter. With the first mechanism, two parameters are written to registers controlling the optical transmitter. This first control mechanism may be referred to as a dual control loop because two parameters are used. One parameter is used to control the power level used to send a logical '1' and the other parameter is used to control the power level used to send a logical '0'. This first control mechanism can be used to configure the optical transmitter with the first settings which are used to generate the eye pattern 210 with a crossing point of 50%, as shown in FIG. 2.

In the second control mechanism, a single parameter is used to control the average power level of the optical transmitter. This second control mechanism may be referred to as a single control loop because a single parameter is used. This second control setting may be used to configure the optical transmitter with the second settings which are used to generate the eye pattern 310 with a crossing point of 40%, as shown in FIG. 3. The eye diagram 310 may have a lower low power level 312 than the low power level 212 which may be lower than can be effectively measured using the monitoring photo diode (MPD) used in the feedback look of the laser in the optical transmitter of the ONU. This may make using the single control loop mechanism more effective that the dual control loop mechanism for lowering the crossing point of the eye diagram because the MPD only is used to monitor average power detection, instead of being used to measure both high power level and low power level.

Once it was known that different OLTs worked reliably with different eye patterns, the inventor created methodologies to determine which settings to use for the optical transmitter of the ONU based on the OLT coupled with the applicant's ONU. Thus, in embodiments, an optical network unit (ONU) of a gigabit-capable passive optical network (GPON) adapts to an optical line termination (OLT) to which it is coupled. The ONU determines a type of the OLT to which it is coupled, and based on the type, configures an optical transmitter of the ONU to be compatible with the OLT. The ONU can also determine which OMCI software stack to load based on the type of the OLT.

While the ITU-T recommendations provide mechanisms for an OLT to identify itself to an ONU, communication must be properly established between the OLT and the ONU for those mechanisms to work. If the optical transmitter of the ONU and the optical receiver of the OLT are unable to communicate, which is the case described above for the OLT from vendor A, the standard mechanisms established by the ITU-T recommendations will not reliably work, so alternative methods of determining the type of OLT coupled to the ONU were developed.

In a first method to adapt to different OLT characteristics, multiple settings are stored in the ONU, along with a respective tag that indicates a type (e.g. model and/or brand) of OLT associated with the settings. A default setting is used to configure the ONU and then normal configuration of the GPON is allowed to take place, including a ranging process between the ONU and OLT. The ranging process determines a distance between the ONU and OLT to allow the upstream transmissions from the ONU to the OLT to be properly timed with other ONUs to avoid collisions between transmissions of different ONUs, and is described in ITU-T recommendation G.984.3.

The ONU then waits for a predetermined time period to receive an OMCI message, from the OLT, that includes a managed entity of an OLT-G. The predetermined time period may be selected to be longer than the time it takes to receive the OMCI message by the ONU after it is added to a system in a system where the ONU is known to be configured to be compatible with the OLT. The predetermined time period may also depend on a statistical distribution of the times it takes to receive an OMCI message in a working system, such as selecting a predetermined time period that is 1, 2, or 3 standard deviations greater than the mean of a set of measured or expected OMCI receipt times. Any predetermined time period can be used that is determined to provide an acceptable success rate for adding an ONU to a GPON with this method.

If the OMCI message is received within the predetermined time period, the type of the OLT is extracted from the OMCI message and is used, along with the tags of the stored settings, to determine which one of the multiple settings to use to configure the ONU. Once the setting appropriate for the type of the OLT has been determined, that setting is used to configure the ONU and that setting may be set as the default setting for the ONU. The ONU may be rebooted to load new settings in some embodiments, although other embodiments may provide the ability to change the settings in the ONU without a reboot. In some embodiments, the tags that are stored with the settings can be directly compared to the data sent in the OMCI message to identify the type of the OLT. In other embodiments, the data sent in the OMCI message is processed to determine an associated, such as to access a separate table that uses the data sent to find an associated tag to use in the search for in the stored settings. The OMCI message may contain an OLT Vendor ID that can be used to determine a default brand tag associated with ONU settings for one or more OLTs having that brand. The OMCI message may also have and Equipment ID that can be used to determine a default tag associated with ONU settings for an OLT with that OLT Vendor ID and Equipment ID. The OMCI message may contain a Version which can be used to determine a tag associated with ONU settings for an OLT with that OLT Vendor ID, and Equipment ID. A hierarchical search may be used so that a the default brand tag associated with the OLT Vendor ID is used if no other tag is found that is associated with the provided Vendor ID and Equipment ID, and that a tag associated with OLT Vendor ID and Equipment ID is used if no tag is found that is associated with the provided OLT Vendor ID, Equipment ID, and Version.

If, however, the predetermined time period elapses before the OMCI message is received, the ONU is configured differently and a new ranging process is initiated. Then the ONU waits for up to the predetermined time period again until it receives an OMCI message. This may be repeated, using different ONU configurations, until the expected OMCI message is received. The different ONU configurations used for each attempt at ranging may be based on the stored settings, or may simply vary a parameter of the optical transmitter, such as the crossing point of the eye diagram.

In a second method to adapt to different OLT characteristics, the ONU retrieves first settings from a first storage location in a memory of the ONU and first information associated with the first settings from a second storage location in the memory. The optical transmitter of the ONU is then configured using the first settings, and the ONU waits to receive a first Upstream_Overhead PLOAM message from OLT. A first set of delimiter bytes is extracted from the first Upstream_Overhead PLOAM message and compared to the first information retrieved from the memory. If the first information is different than the first set of delimiter bytes, the configuration of the ONU is changed. The configuration of the ONU can be changed by various method, but in some embodiments second settings are stored in the first storage location of the memory and the first set of delimiter bytes are stored in the second storage location. The second settings may be retrieved from the memory of the ONU based on the first set of delimiter bytes. After the second settings are stored, the ONU may be rebooted to reconfigure the ONU using the second settings. In other embodiments, the second settings may be used to directly reconfigure the ONU.

Once the ONU has been reconfigured, it then waits to receive a second Upstream_Overhead PLOAM message from the OLT and extracts a second set of delimiter bytes. It should be noted that the both the first set of delimiter bytes and the second set of delimiter bytes are extracted from the same position of their respective Upstream_Overhead PLOAM messages. The second storage location of the memory is accessed to retrieve the information (i.e. the first set of delimiter bytes that were stored there earlier) associated with the second settings which were used to configure the ONU and the second set of delimiter bytes are compared with the retrieved information to make sure that they match. Once that has been ascertained, a Serial_Number_ONU PLOAM message is sent by the ONU to the ONT.

In some embodiments of the second method, the first settings include first data to set the laser used in the optical transmitter of the ONU to have a first crossing point, that may be about 50%, which is compatible with an optical receiver of a first type of OLT, and the second settings include second data to set the laser to have a second crossing point, that may be about 40%, which is compatible with an optical receiver of a second type of OLT. The first settings may include a setting to enable a dual control loop for the laser, and the second settings may include a setting to enable a single control loop for the laser.

In some embodiments the second method may also include receiving an OMCI message comprising an identifier of a type of the OLT and determining whether the type of the OLT is compatible with the second settings. In response to that determination of compatibility, the ONU may be enabled for data communication with the OLT.

In addition to being used to configure the optical transmitter of the ONU, the methods described herein can also be used to determine a compatible OMCI software stack that is compatible with the coupled OLT. The compatible OMCI software stack may then be loaded by the ONU and executed to enable communication between the ONU and the OLT.

Reference now is made in detail to the examples illustrated in the accompanying drawings and discussed below.

Figure 4:
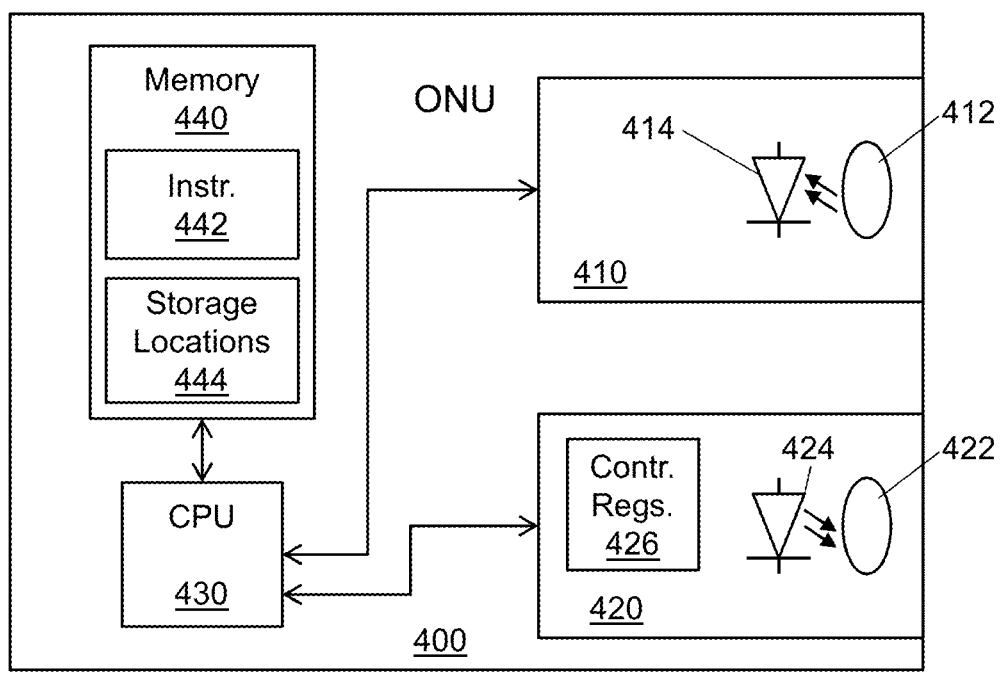
FIG. 4 is a block diagram of an embodiment of an optical network unit (ONU)

FIG. 4 is a block diagram of an embodiment of an optical network unit (ONU) 400. The ONU 400 includes an optical receiver 410, an optical transmitter 420, a processor 430 coupled to both the optical receiver 410 and the optical transmitter 420, and one or more memory devices 440 coupled to the processor 430. The one or more memory devices 440 store instructions 442 which, as executed by the processor 430, result in one or more of the methods disclosed here being performed. The one or more memory devices 440 also include storage locations 444 that can be used to store and/or retrieve various configuration data and associated information for the ONU as well as other types of data. The one or more memory devices 440 may include volatile memory and/or non-volatile memory. Examples of volatile memory that may be used in embodiments include, but are not limited to, static random-access memory (SRAM), dynamic random-access memory (DRAM), double data-rate DRAM (DDR), and high bandwidth memory (HBM). Examples of non-volatile memory that may be used in embodiments include, but are not limited to, flash memory, electrically-erasable programmable read-only memory (EEPROM), Intel Optane™ technology memory, hard-disk drives (HDD), solid-state drives (SSD), and optical disks.

The processor 430 may be any sort of electronic device that can perform a variety of functions based on the instructions 442. The processor 430 may refer to any one of a wide variety of devices that may be referred to by a variety of names in the industry, including a CPU, a microprocessor, a computing device, a computer, a core, or an embedded processor, to name but a few. The processor 430 can have any type of architecture, such as a reduced instruction set computer architecture (RISC), a complex instruction set computer architecture (CISC), a Von Neumann architecture, or a Harvard architecture, and can any length of instruction, such as 32 bit or 64 bit instructions. In some embodiments, the processor 430 may be compatible with the Intel® 64 or IA-32 instruction sets from Intel Corporation, the T32, A32, or A64 instruction sets from ARM Holdings, or any other instruction set suitable for controlling the ONU.

The optical receiver 410 includes receive optics 412 which couple light received from an optical fibre to an optical transistor 414 or some other type of light-sensitive electronic device that can translate a power level of incident optical energy to an electrical signal. Various control messages defined by ITU-T recommendations and data packets may be received by the optical receiver 410 and sent to the processor 430. A few control messages that may be received by the ONU are described below.

Table 1 shows the format for an Upstream_Overhead PLOAM downstream message consistent with § 9.2.3.1 of ITU-T Recommendation G.984.3 "Gigabit-capable Passive Optical Networks (G-PON): Transmission convergence layer specification."

TABLE 1

Upstream_Overhead PLOAM Message Format

| Byte# | Content | Description |
| --- | --- | --- |
| 1 | 0xFF | Indicator of a broadcast message to all ONUs |
| 2 | 0x01 | Message ID for "Upstream_Overhead" |
| 3 | G | G = Number of guard bits |
| 4 | X | X = Number of type 1 preamble bits |
| 5 | Y | Y = Number of type 2 preamble bits |
| 6 | C | C = Pattern for type 3 preamble bits |
| 7 | B1 | B1 = Delimiter byte 1 |
| 8 | B2 | B2 = Delimiter byte 1 |

TABLE 1-continued

Upstream_Overhead PLOAM Message Format

| Byte# | Content | Description |
| --- | --- | --- |
| 9 | B3 | B3 = Delimiter byte 1 |
| 10 | S | S = Various status bits |
| 11 | D1 | D1 = MSB of pre-assigned delay |
| 12 | D2 | D2 = LSB of pre-assigned delay |

An example of an Upstream_Overhead PLOAM message from an OLT manufactured by Vendor N is 0x200000AAAB60730000000000 which includes delimiter bytes of 0xAB, 0x60, and 0x73. An example of an Upstream_Overhead PLOAM message from an OLT manufactured by Vendor A is 0x200000AAAA85B32204BF0000 which includes delimiter bytes of 0xAA, 0x85, and 0xB3. Upstream_Overhead PLOAM messages from other models of OLTs from vendor N or vendor A as well as OLTs from other vendors may use other delimiter byte values.

Table 2 shows the format for an OMCI message consistent with ITU-T Recommendation G.988 "ONU management and control interface (OMCI) specification." The message format is provided in § 11.2 and the OLT-G attribute information is provided in § 9.12.2.

TABLE 2

OMCI Message Format

| Byte# | Content | Description |
| --- | --- | --- |
| 1-2 | ONU-ID | Transaction correlation ID |
| 3 | 0x08 | "Set" attribute Message Type |
| 4 | 0x0B | Extended OMCI message device identifier |
| 5-8 | 131 | Managed entity identifier for OLT-G |
| 9-10 | 65 | Message contents length |
| 10-13 | V1-V4 | OLT vendor |
| 14-33 | E1-E20 | Equipment ID |
| 34-47 | R1-R14 | Version |
| 48-61 | T1-T14 | Time of Day information (optional) |
| 62-65 | Calculated | Message integrity check |

The optical transmitter 420 includes a light source 424, which may be a laser diode, a solid-state laser, a gas laser, any other type of laser, or some other type of light source, depending on the embodiment. The light emitted by the light source 424 is modulated using data sent from the processor 430 and then coupled to an optical fibre by transmit optics 422. The optical transmitter 420 may also include control registers 426 that can be written to by the processor 430 to control the light source 424 or other aspects of the optical transmitter 420. In some embodiments the control registers 426 include a selection control to select between a dual control loop and a single control loop for the laser. The control registers 426 may also include registers that control the high power level of the laser, the low power level of the laser, or the average power level of the laser.

Various messages may be sent upstream by the processor 430, through the optical transmitter 420 and fibre, to the OLT. Various control messages defined by the ITU-T recommendations and data packets may be sent upstream from the ONU 400 to the OLT.

Table 3 shows the format for a Serial_Number_ONU PLOAM upstream message consistent with § 9.2.4.1 of ITU-T Recommendation G.984.3 "Gigabit-capable Passive Optical Networks (G-PON): Transmission convergence layer specification."

TABLE 3

Serial_Number_ONU PLOAM Message Format

| Byte# | Content | Description |
|---|---|---|
| 1 | ONU-ID | The ID assigned to the ONU (0xFF if not yet assigned an ID) |
| 2 | 0x01 | Message ID for "Serial_Number_ONU" |
| 3 | VID1 | Vendor_ID byte 1 |
| 4 | VID2 | Vendor_ID byte 2 |
| 5 | VID3 | Vendor_ID byte 3 |
| 6 | VID4 | Vendor_ID byte 4 |
| 7 | VSSN1 | Vendor-specific serial number byte 1 |
| 8 | VSSN2 | Vendor-specific serial number byte 2 |
| 9 | VSSN3 | Vendor-specific serial number byte 3 |
| 10 | VSSN4 | Vendor-specific serial number byte 4 |
| 11 | R | R = MSB of random delay used by ONU when sending this message |
| 12 | RS | R = LSB of random delay used by ONU when sending this message S = Various status bits |

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

These computer program instructions, such as those used to implement any method described herein, may also be stored in a non-transitory computer-readable medium, such as a tangible computer memory, or tangible memory, that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
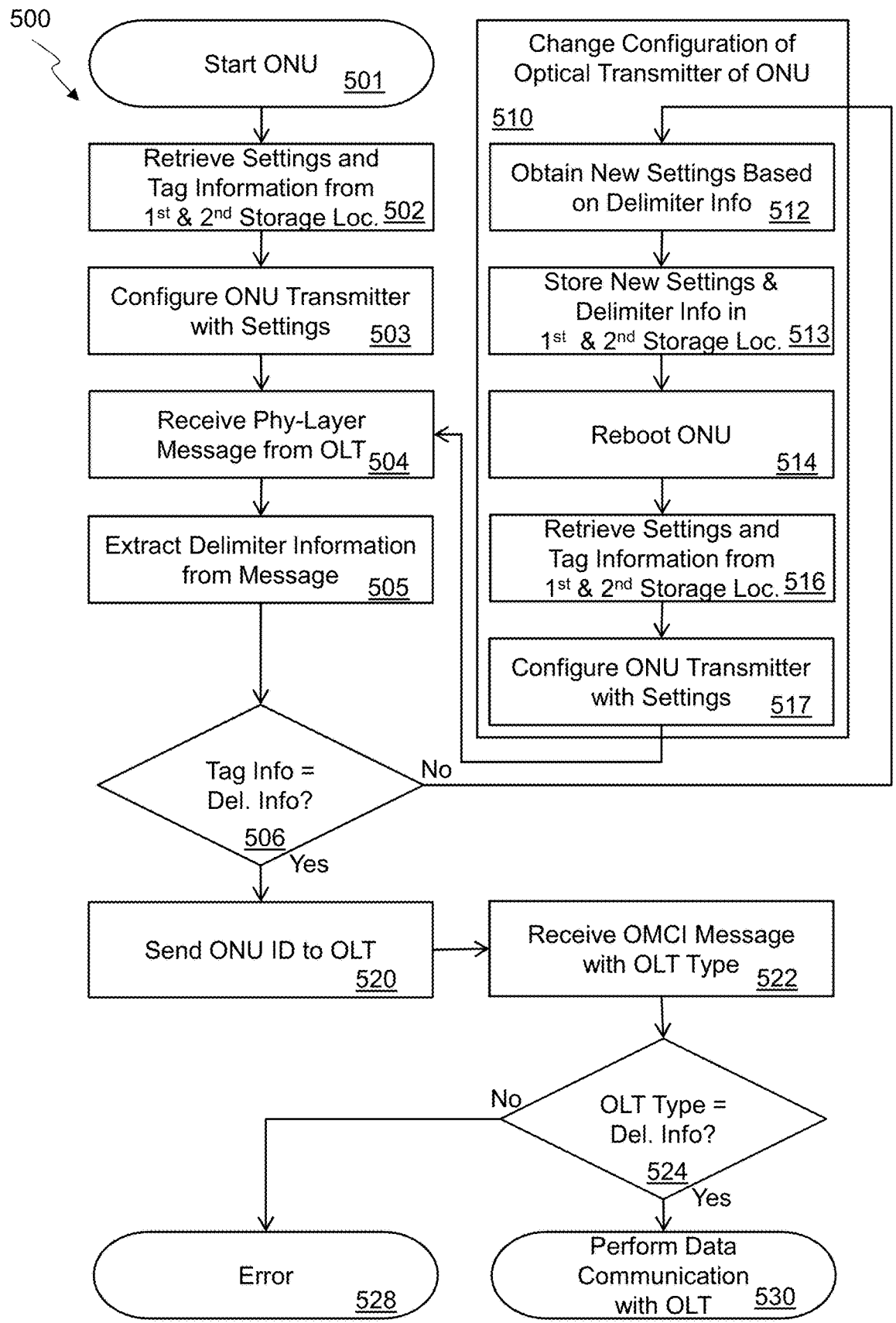
FIG. 5 shows a flowchart for an embodiment of a method of adapting to differing optical receiver characteristics.

FIG. 5 shows a flowchart 500 for an embodiment of a method of adapting to differing optical receiver characteristics. The method of the flowchart 500 may be performed by executing instructions 442, stored in one or more memory devices 440, by a processor 430 of an ONU 400 as shown in FIG. 4. The method begins by starting 501 a first apparatus, such as the ONU 400, and, in at least some embodiments, retrieving 502 first settings from a first storage location of the storage locations 444 in the one or more memory devices 440 and first information associated with the first settings from a second storage location of the storage locations 444 in the one or more memory devices 440. The first settings may be default settings for the ONU. The optical transmitter 420 of the ONU 400 may be configured using the first settings by storing information derived from the first settings into one or more control registers 426.

The method continues with receiving 504, at the first apparatus (such as the ONU 400), a first physical-layer management message from a second apparatus (such as an OLT) over an optical communication link which may be a part of a Gigabit-capable Passive Optical Network (G-PON). In at least some embodiments, the first physical-layer management message is compliant with an Upstream_Overhead PLOAM message as defined in ITU-T Recommendation G.984.3 and shown in Table 1 above. Second information is then extracted 505 from the first physical-layer management message and compared 506 to the first information. In at least some embodiments, the second information includes at least one delimiter byte of the Upstream_Overhead PLOAM message (see Table 1). In response to a determination that the first information is different than the second information, a configuration for an optical transmitter of the first apparatus is changed 510.

Various embodiments may change the configuration 510 using various methods, but in at least some embodiments, the configuration for the optical transmitter of the first apparatus is changed by obtaining 512 new settings, such as optical transmitter configuration data, based on the second information and storing 513 the new settings (e.g. optical transmitter configuration data) in the second storage location. The second information is stored 513 in the first storage location, replacing the second information. The new settings, which may also be referred to as alternative settings, may be retrieved by comparing second information (e.g. the at least one delimiter byte) to tags associated with settings stored in the first apparatus. The changing of the configuration 510 continues with rebooting 514 the first apparatus and, as a result of the rebooting, retrieving 516 the second information from the first storage location and the new settings from the second storage location, and configuring 517 the first apparatus with the new settings. In other embodiments, the configuration of the optical transmitter of the first apparatus may be changed without rebooting the first apparatus, such as by simply re-writing control registers of the optical transmitter or by other techniques, such as resetting only the optical transmitter subsection of the first apparatus.

In some embodiments, the configuration for the optical transmitter of the first apparatus includes a first control setting that selects between a dual control loop and a single control loop for a transmit laser in the first apparatus and the changing of the configuration for the optical transmitter of the first apparatus includes changing the first control setting. The changing of the configuration for the optical transmitter of the first apparatus may include changing one or more settings for a transmit laser in the first apparatus to adapt to a characteristic of an optical receiver of the second apparatus and/or changing one or more settings for a transmit laser in the first apparatus to change a crossing-point of an optical transmission by the first apparatus. In at least one embodiment, the crossing point may be changed between about 50% and about 40%. In some embodiments, default settings may include a setting to enable a dual control loop and/or set a crossing point of about 50% for a transmit laser in the first apparatus, and alternative settings may include a setting to enable a single control loop and/or set a crossing point for about 40% for the transmit laser in the first apparatus. The default settings may include first data to set a transmit laser in the first apparatus to have a first crossing point which is compatible with an optical receiver of a first type of the second apparatus, and the alternative settings may include second data to set the transmit laser to have a second crossing point which is compatible with an optical receiver of a second type of the second apparatus.

The method continues with receiving 504 a second physical-layer management message from the second apparatus, which may be compliant with an Upstream_Overhead PLOAM message as defined in ITU-T Recommendation G.984.3 and shown in Table 1 above, over the optical communication link at the first apparatus, and extracting 505 third information, which may be the delimiter bytes from the Upstream_Overhead PLOAM message, from the second physical-layer management message. The second information is then compared 506 to the third information and in response to said determination that second information is the same as the third information, sending 520 an identifier of the first apparatus to the second apparatus over the optical communication link. The identifier of the first apparatus may be sent using a Serial_Number_ONU PLOAM message as defined in ITU-T Recommendation G.984.3 (see Table 3 above). In some embodiments, the determination that second information is the same as the third information may be used to select software based on the third information and to install the selected software on the second apparatus. In at least one embodiment, an OMCI software stack compatible with a type of OLT that generates particular delimiter bytes captured as the third information is selected based on the third information and installed on the ONU.

Some embodiments may also include receiving 522 a third message that includes an identifier of a type of the second apparatus. The third message may include an OMCI message with a managed entity identifier of 131 to indicate a managed entity of an OLT-G as defined in ITU-T Recommendation G.988 (see Table 2 above). The method continues with determining 524 whether the type of the second apparatus, received in the third message, is compatible with the configuration for the optical transmitter of the first apparatus. The third information, which may be one or more delimiter bytes extracted from the second physical-layer management message, has already been determined to be the same as the second information, so the third information can be used to determine that the optical transmitter of the first apparatus is configured in such a way to be compatible with the type of the second apparatus. In response to said determination of compatibility, the first apparatus is enabled 530 for data communication with the second apparatus on the optical communication link. If the delimiter information received in the second physical-layer management message is not compatible with the type of the second apparatus, an error may be generated 538.

Figure 6:
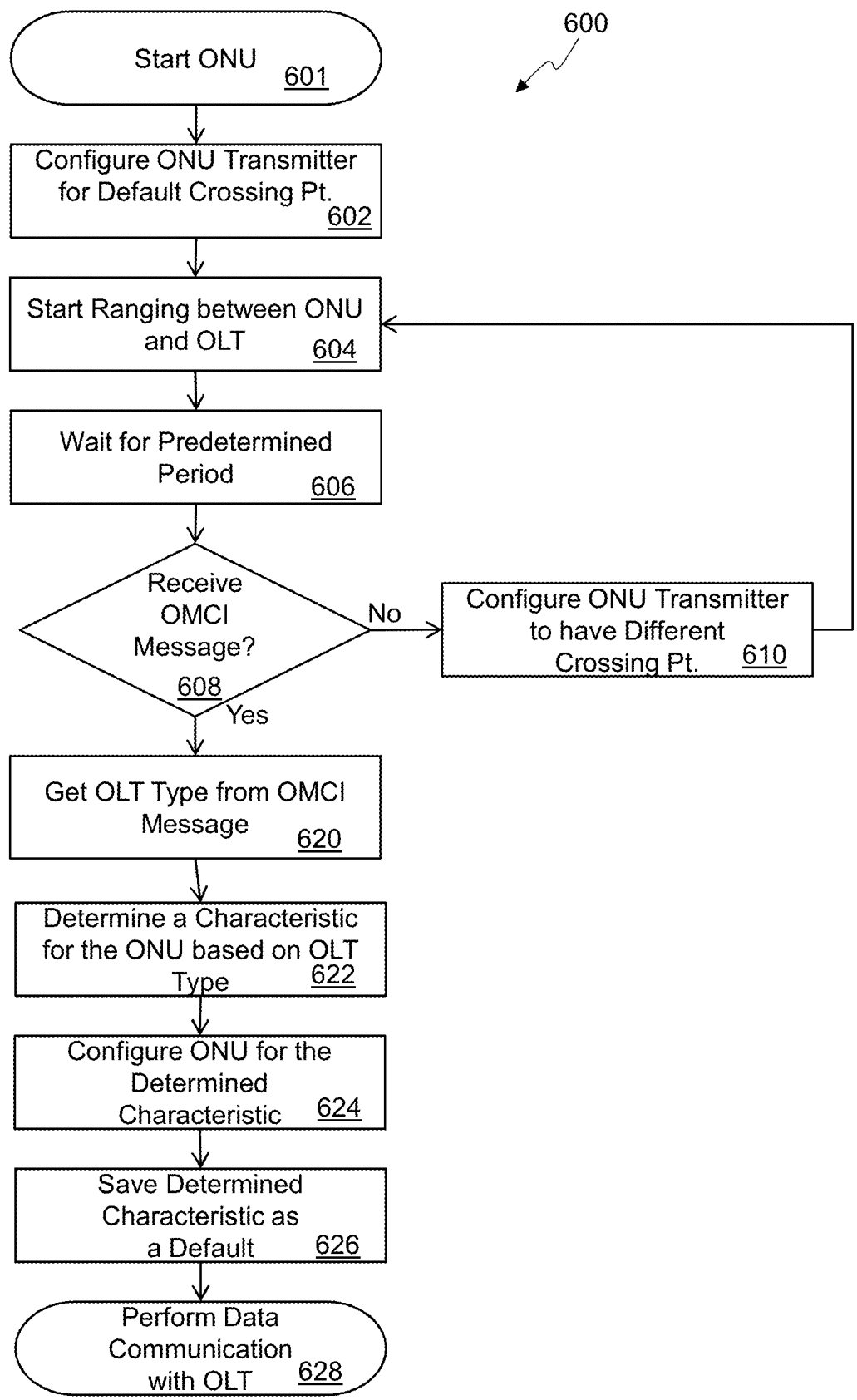
FIG. 6 shows a flowchart for an alternate embodiment of a method of adapting to differing optical receiver characteristics.

FIG. 6 shows a flowchart 600 for an alternate embodiment of a method of adapting to differing optical receiver characteristics. The method of the flowchart 600 may be performed by executing instructions 442, stored in one or more memory devices 440, by a processor 430 of an ONU 400 as shown in FIG. 4. The method includes starting the ONU 601 and configuring 602 a transmit laser of the ONU to have a default crossing point. The ONU then participates 604 in a ranging process with the OLT. The ONU waits 606 for up to a predetermined time period to receive 608, from the OLT, an OMCI message that includes a managed entity identifier with a value of 131 to indicate a managed entity of an OLT-G as defined in ITU-T Recommendation G.988.

In response to the predetermined time period elapsing before the OMCI message is received, the transmit laser of the ONU is configured 610 to have a second crossing point that is different than the default crossing point before repeating the ranging 604 and waiting 606. The ONU may be rebooted in some embodiments to change its configuration, but in other embodiments, the ONU may be reconfigured without rebooting. In at least one embodiment, the default crossing point is about 50% and the second crossing point is about 40%. In some embodiments, the method repeats the ranging and waiting steps with additional crossing points until the OMCI message is received.

In response to receiving the OMCI message, the type of the OLT is extracted 620 from the OMCI message and a characteristic is determined 622 based on the type of the OLT. The determined characteristic may be a particular crossing point of the transmit laser of the ONU, power levels of the transmit laser, software, such as an OMCI stack, compatible with the type of OLT, or any other characteristic of the ONU. The ONU is then configured 624 to have the determined characteristic and the determined characteristic may be saved 626 as a default. The ONU is the enabled 628 to communicate with the OLT.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be said to be non-transitory. A computer data transmission medium, such as a transmission line, a coaxial cable, a radio-frequency carrier, and the like, may also be said to store data, although any data storage in a data transmission medium can be said to be transitory. Nonetheless, a computer-readable storage medium, as the term is used herein, does not include a computer data transmission medium.

Computer program code (which also may be called instructions) for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described below:

Embodiment 1

A method for adapting to differing optical receiver characteristics, the method comprising: receiving, at a first apparatus, a first physical-layer management message from a second apparatus over an optical communication link; and retrieving first information related to a configuration of the first apparatus from a first storage location; extracting second information from the first physical-layer management message; determining that the first information is different than the second information; in response to said determination that the first information is different than the second information, replacing the first information in the first storage location with the second information and changing a configuration for an optical transmitter of the first apparatus.

Embodiment 2

The method of Embodiment 1, the changing of the configuration for the optical transmitter of the first apparatus comprising: obtaining optical transmitter configuration data based on the second information; storing the optical transmitter configuration data in a second storage location; and rebooting the first apparatus.

Embodiment 3

The method of Embodiment 1, wherein the configuration for the optical transmitter of the first apparatus includes a first control setting that selects between a dual control loop and a single control loop for a transmit laser in the first apparatus.

Embodiment 4

The method of Embodiment 3, the changing of the configuration for the optical transmitter of the first apparatus comprising changing the first control setting.

Embodiment 5

The method of Embodiment 1, the changing of the configuration for the optical transmitter of the first apparatus comprising changing one or more settings for a transmit laser in the first apparatus to adapt to a characteristic of an optical receiver of the second apparatus.

Embodiment 6

The method of Embodiment 1, the changing of the configuration for the optical transmitter of the first apparatus comprising changing one or more settings for a transmit laser in the first apparatus to change a crossing-point of an optical transmission by the first apparatus.

Embodiment 7

The method of Embodiment 6, wherein the crossing point changes between about 50% and about 40%.

Embodiment 8

The method of Embodiment 1, further comprising configuring the optical transmitter of the first apparatus to default settings before the receiving of the first physical-layer management message; wherein the default settings are associated with the first information, and alternative settings associated with the second information are used for the changing of the configuration for the optical transmitter of the first apparatus.

Embodiment 9

The method of Embodiment 8, wherein default settings include a setting to enable a dual control loop for a transmit laser in the first apparatus, and the alternative settings include a setting to enable a single control loop for the transmit laser in the first apparatus.

Embodiment 10

The method of Embodiment 8, wherein default settings configure a transmit laser in the first apparatus for a crossing point of about 50%, and the alternative settings configure the a transmit laser in the first apparatus for a crossing point of about 40%.

Embodiment 11

The method of Embodiment 8, wherein the default settings include first data to set a transmit laser in the first apparatus to have a first crossing point which is compatible with an optical receiver of a first type of the second apparatus, and the alternative settings include second data to set the transmit laser to have a second crossing point which is compatible with an optical receiver of a second type of the second apparatus.

Embodiment 12

The method of Embodiment 1, wherein the first apparatus is an Optical Network Unit (ONU) of a Gigabit-capable Passive Optical Network (G-PON); the second apparatus is an Optical Line Termination (OLT) of a G-PON; the first physical-layer management message is compliant with an Upstream_Overhead PLOAM message as defined in ITU-T Recommendation G.984.3; and the second information comprises at least one delimiter byte of the Upstream_Overhead PLOAM message.

Embodiment 13

The method of Embodiment 1, further comprising: receiving a second physical-layer management message from the second apparatus over the optical communication link at the first apparatus; and retrieving the second information from the first storage location; extracting third information from the second physical-layer management message; determining that the second information retrieved from the first storage location is the same as the third information; in response to said determination that second information is the same as the third information, sending an identifier of the first apparatus to the second apparatus over the optical communication link.

Embodiment 14

The method of Embodiment 13, wherein in response to said determination that second information is the same as the third information, the method further comprises: selecting software based on the third information; and installing the selected software on the second apparatus.

Embodiment 15

The method of Embodiment 14, wherein the selected software is an OMCI stack compatible the second apparatus; the first apparatus is an Optical Network Unit (ONU) of a Gigabit-capable Passive Optical Network (G-PON); and the second apparatus is an Optical Line Termination (OLT) of a G-PON.

Embodiment 16

The method of Embodiment 13, wherein the first apparatus is an Optical Network Unit (ONU) of a Gigabit-capable Passive Optical Network (G-PON); the second apparatus is an Optical Line Termination (OLT) of a G-PON; the first physical-layer management message and the second physical-layer management message are both compliant with an Upstream_Overhead PLOAM message as defined in ITU-T Recommendation G.984.3; the second information and third information both comprise at least one delimiter byte of the respective Upstream_Overhead PLOAM message; and a Serial_Number_ONU PLOAM message as defined in ITU-T Recommendation G.984.3 is used for the sending of the identifier of the first apparatus to the second apparatus over the optical communication link.

Embodiment 17

The method of Embodiment 13, further comprising: receiving a third message comprising an identifier of a type of the second apparatus; determining whether the type of the second apparatus is compatible with the configuration for the optical transmitter of the first apparatus; in response to said determination of compatibility enabling the first apparatus for data communication with the second apparatus on the optical communication link.

Embodiment 18

The method of Embodiment 17, wherein the first apparatus is an Optical Network Unit (ONU) of a Gigabit-capable Passive Optical Network (G-PON); the second apparatus is an Optical Line Termination (OLT) of a G-PON; the first physical-layer management message and the second physical-layer management message are both compliant with an Upstream_Overhead PLOAM message as defined in ITU-T Recommendation G.984.3; the second information and third information both comprise at least one delimiter byte of the respective Upstream_Overhead PLOAM message; a Serial_Number_ONU PLOAM message as defined in ITU-T Recommendation G.984.3 is used for the sending of the identifier of the first apparatus to the second apparatus over the optical communication link; and the third message comprises an OMCI message with a managed entity identifier of 131 to indicate a managed entity of an OLT-G as defined in ITU-T Recommendation G.988.

Embodiment 19

A method for adapting to differing Optical Line Termination (OLT) characteristics by an Optical Network Unit (ONU), the method comprising the steps of: configuring a transmit laser of the ONU to have a default crossing point; participating in a ranging process with the OLT; waiting for up to a predetermined time period to receive an OMCI message from the OLT, the OMCI message comprising a managed entity identifier of 131 to indicate a managed entity of an OLT-G as defined in ITU-T Recommendation G.988; in response to the predetermined time period elapsing before the OMCI message is received, configuring the transmit laser of the ONU to have a second crossing point that is different than the default crossing point before repeating said ranging and said waiting steps; in response to receiving the OMCI message: extracting the type of the OLT from the OMCI message; determining a characteristic for the ONU based on the type of the OLT; configuring the ONU to have the determined characteristic.

Embodiment 20

The method of Embodiment 19, further comprising saving the determined characteristic as a default for the ONU.

Embodiment 21

The method of Embodiment 19, wherein the determined characteristic is a crossing point of the transmit laser of the ONU.

Embodiment 22

The method of Embodiment 19, wherein the default crossing point is about 50% and the second crossing point is about 40%.

Embodiment 23

The method of Embodiment 19, further comprising repeating said ranging and said waiting steps with additional crossing points until the OMCI message is received.

Embodiment 24

The method of Embodiment 19, wherein determined characteristic is an OMCI stack compatible with the type of the OLT.

Embodiment 25

An Optical Network Unit (ONU) comprising an optical receiver, an optical transmitter including a laser, a processor coupled to both the optical receiver and the optical transmitter, and one or more memory devices coupled to the processor, the one or more memory devices storing instructions which, as executed by the processor, result in performing any one of the methods of Embodiment 1 through Embodiment 24.

Embodiment 26

An article of manufacture comprising a non-transitory storage medium having instructions stored thereon that, if executed by a computing device, perform any one of the methods of Embodiment 1 through Embodiment 24.

As used in this specification and the appended claims, the singular forms "a", "an", and "the" include plural referents unless the content clearly dictates otherwise. Thus, for example, reference to an element described as "a processor" may refer to a single processor, two processors, or any other number of processors but a reference to "a single processor" refers to only one processor. As used in this specification and the appended claims, the term "or" is generally employed in its sense including both a union operator (OR) and an intersection operator (AND), which may also be referred to as an "inclusive OR" or an "and/or" unless the content clearly dictates otherwise. As used in this specification and the appended claims, the term "coupled" includes direct and indirect connections. Moreover, where first and second devices are coupled, intervening devices, including active devices, may be located there between. As used in this specification and the appended claims, the phrase "based on" should be interpreted as being open ended, equivalent to "based, at least in part, on" and allow for the action to be based on other elements in addition to the elements specified. A string with a prefix of "0x" is intended to be interpreted as a hexadecimal representation of a numerical quantity. A set of numbers without a prefix should generally be interpreted as a base 10 representation of a numerical quantity. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.33, and 5). Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. An Optical Network Unit (ONU) comprising an optical receiver, an optical transmitter including a laser, a processor coupled to both the optical receiver and the optical transmitter, and one or more memory devices coupled to the processor, the one or more memory devices storing instructions which, as executed by the processor, result in:

retrieving first settings from a first storage location in the one or more memory devices and first information associated with the first settings from a second storage location in the one or more memory devices;

configuring the optical transmitter using the first settings;

receiving a first Upstream_Overhead PLOAM message from an Optical Line Termination (OLT) through the optical receiver;

extracting a first set of delimiter bytes from the first Upstream_Overhead PLOAM message;

determining that the first information is different than the first set of delimiter bytes;

in response to said determination, storing second settings in the first storage location and storing the first set of delimiter bytes in the second storage location, the second settings obtained from the one or more memory devices based on the first set of delimiter bytes;

rebooting the ONU;

configuring the optical transmitter using the second settings;

receiving a second Upstream_Overhead PLOAM message from the Optical Line Termination (OLT) through the optical receiver;

extracting a second set of delimiter bytes from the second Upstream_Overhead PLOAM message;

reading the first set of delimiter bytes from the second storage location;

ascertaining that the second set of delimiter bytes match the first set of delimiter bytes; and in response to said ascertainment, sending a Serial_Number_ONU PLOAM message to the ONT through the optical transmitter;

wherein the first Upstream_Overhead PLOAM message, the second Upstream_Overhead PLOAM message, and the Serial_Number_ONU PLOAM message are compliant with ITU-T Recommendation G.984.3.

2. The ONU of claim 1, wherein the first settings include first data to set the laser to have a first crossing point of a first eye diagram which is compatible with an optical receiver of a first type of OLT, and the second settings include second data to set the laser to have a second crossing point of a second eye diagram which is compatible with an optical receiver of a second type of OLT.

3. The ONU of claim 1, wherein the instructions, as executed by the processor, further result in:

receiving an OMCI message comprising an identifier of a type of the OLT;

determining whether the type of the OLT is compatible with the second settings; and in response to said determination of compatibility, enabling the ONU for data communication with the OLT.

4. A method for adapting to differing optical receiver characteristics, the method comprising:

receiving, at a first apparatus, a first physical-layer management message from a second apparatus over an optical communication link;

retrieving first information related to a configuration of the first apparatus from a first storage location;

extracting second information from the first physical-layer management message;

determining that the first information is different than the second information; and in response to said determination that the first information is different than the second information:

replacing the first information in the first storage location with the second information;

obtaining optical transmitter configuration data based on the second information; and changing a configuration for an optical transmitter of the first apparatus using the optical transmitter configuration data to change one or more settings for a transmit laser in the first apparatus to change a crossing-point of an optical transmission eye diagram by the first apparatus.

5. The method of claim 4, the changing of the configuration for the optical transmitter of the first apparatus comprising:

storing the optical transmitter configuration data in a second storage location; and rebooting the first apparatus.

6. The method of claim 4, wherein the configuration for the optical transmitter of the first apparatus includes a first control setting that selects between a dual control loop and a single control loop for the transmit laser in the first apparatus;

wherein the single control loop manages a single parameter of the optical transmitter that controls an average power level of the optical transmitter; and the dual control loop manages a first parameter of the optical transmitter that controls a power level to send a logical '1' and a second parameter of the optical transmitter that controls a power level to send a logical '0'.

7. The method of claim 4, the changing of the configuration for the optical transmitter of the first apparatus comprising changing one or more settings for the transmit laser in the first apparatus to adapt to a characteristic of an optical receiver of the second apparatus.

8. The method of claim 4, further comprising configuring the optical transmitter of the first apparatus to default settings before the receiving of the first physical-layer management message;

wherein the default settings are associated with the first information, and alternative settings associated with the second information are used for the changing of the configuration for the optical transmitter of the first apparatus.

9. The method of claim 8, wherein the default settings include first data to set the transmit laser in the first apparatus to have a first crossing point of a first eye diagram which is compatible with an optical receiver of a first type of the second apparatus, and the alternative settings include second data to set the transmit laser to have a second crossing point of a second eye diagram which is compatible with an optical receiver of a second type of the second apparatus;

wherein the crossing-point of the optical transmission eye diagram comprises the first crossing point of the first eye diagram which is compatible with the optical receiver of the first type of the second apparatus.

10. The method of claim 4, further comprising:

receiving a second physical-layer management message from the second apparatus over the optical communication link at the first apparatus;

retrieving the second information from the first storage location;

extracting third information from the second physical-layer management message;

determining that the second information retrieved from the first storage location is the same as the third information; and in response to said determination that second information is the same as the third information, sending an identifier of the first apparatus to the second apparatus over the optical communication link.

11. The method of claim 10, wherein in response to said determination that second information is the same as the third information, the method further comprises:

selecting software based on the third information; and installing the selected software on the second apparatus.

12. The method of claim 11, wherein the selected software is an OMCI stack compatible the second apparatus;

the first apparatus is an Optical Network Unit (ONU) of a Gigabit-capable Passive Optical Network (G-PON); and the second apparatus is an Optical Line Termination (OLT) of a G-PON.

13. The method of claim 10, wherein the first apparatus is an Optical Network Unit (ONU) of a Gigabit-capable Passive Optical Network (G-PON);

the second apparatus is an Optical Line Termination (OLT) of a G-PON;

the first physical-layer management message and the second physical-layer management message are both compliant with an Upstream_Overhead PLOAM message as defined in ITU-T Recommendation G.984.3;

the second information and third information both comprise at least one delimiter byte of the respective Upstream_Overhead PLOAM message; and a Serial_Number_ONU PLOAM message as defined in ITU-T Recommendation G.984.3 is used for the sending of the identifier of the first apparatus to the second apparatus over the optical communication link.

14. The method of claim 10, further comprising:

receiving a third message comprising an identifier of a type of the second apparatus;

determining whether the type of the second apparatus is compatible with the configuration for the optical transmitter of the first apparatus; and in response to said determination of compatibility enabling the first apparatus for data communication with the second apparatus on the optical communication link.

15. The method of claim 14, wherein the first apparatus is an Optical Network Unit (ONU) of a Gigabit-capable Passive Optical Network (G-PON);

the second apparatus is an Optical Line Termination (OLT) of a G-PON;

the first physical-layer management message and the second physical-layer management message are both compliant with an Upstream_Overhead PLOAM message as defined in ITU-T Recommendation G.984.3;

the second information and third information both comprise at least one delimiter byte of the respective Upstream_Overhead PLOAM message;

a Serial_Number_ONU PLOAM message as defined in ITU-T Recommendation G.984.3 is used for the sending of the identifier of the first apparatus to the second apparatus over the optical communication link; and the third message comprises an OMCI message with a managed entity identifier of 131 to indicate a managed entity of an OLT-G as defined in ITU-T Recommendation G.988.

16. An article of manufacture comprising a non-transitory storage medium having instructions stored thereon that, as executed by a computing device, perform a method comprising:

receiving, at a first apparatus, a first physical-layer management message from a second apparatus over an optical communication link; and retrieving first information related to a configuration of the first apparatus from a first storage location;

extracting second information from the first physical-layer management message;

determining that the first information is different than the second information;

in response to said determination that the first information is different than the second information:

replacing the first information in the first storage location with the second information;

obtaining optical transmitter configuration data based on the second information; and changing a configuration for an optical transmitter of the first apparatus using the optical transmitter configuration data to change one or more settings for a transmit laser in the first apparatus to change a crossing-point of an optical transmission eye diagram by the first apparatus.

17. The article of manufacture of claim 16, the changing of the configuration for the optical transmitter of the first apparatus comprising:

storing the optical transmitter configuration data in a second storage location; and rebooting the first apparatus.

18. The article of manufacture of claim 16, the changing of the configuration for the optical transmitter of the first apparatus comprising changing one or more settings for the transmit laser in the first apparatus to adapt to a characteristic of an optical receiver of the second apparatus.

* * * * *